Oct. 21, 1969  J. MERCIER  3,473,324
POSITION CONTROL SYSTEM

Filed Aug 2, 1966  3 Sheets-Sheet 1

INVENTOR
JEAN MERCIER

BY
ATTORNEY

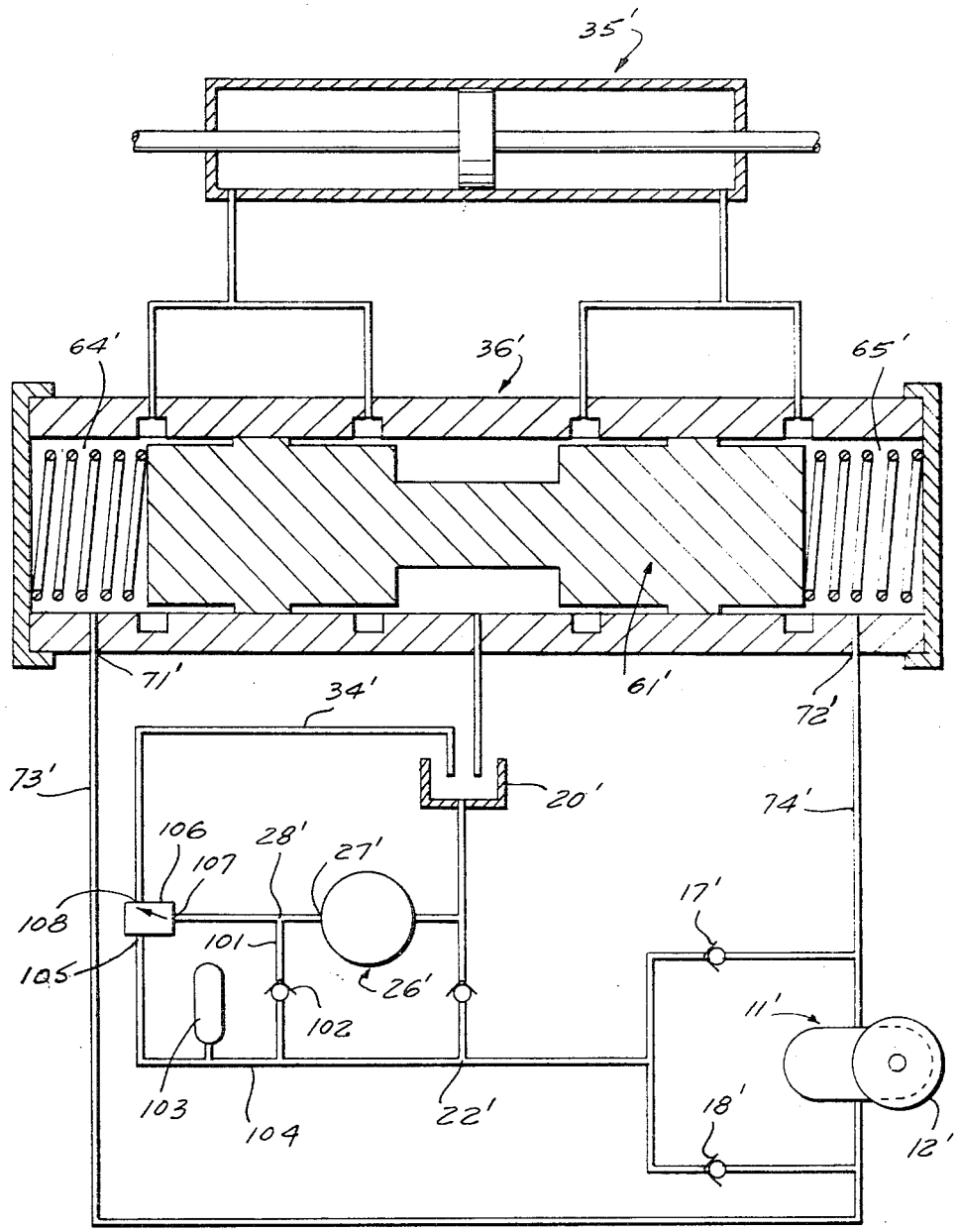

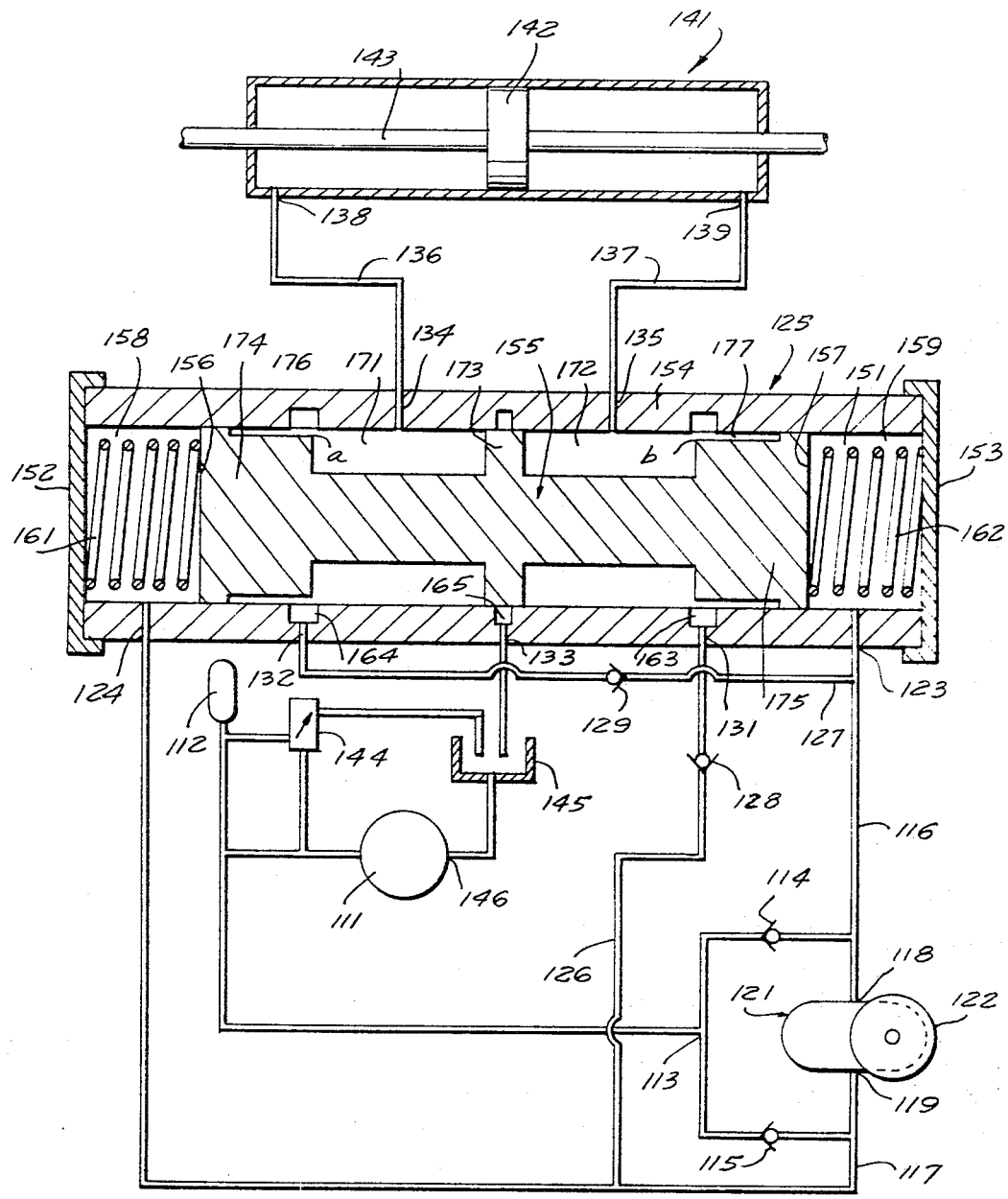

United States Patent Office 3,473,324
Patented Oct. 21, 1969

3,473,324
POSITION CONTROL SYSTEM
Jean Mercier, 501 Bloomfield Ave.,
Caldwell, N.J. 07006
Filed Aug. 2, 1966, Ser. No. 569,614
Claims priority, application France, Aug. 6, 1965,
27,527; Nov. 5, 1965, 37,379; Nov. 29, 1965,
40,084; Mar. 4, 1966, 52,052
Int. Cl. F15b 15/02, 13/042
U.S. Cl. 60—52                                                    7 Claims

ABSTRACT OF THE DISCLOSURE

This invention relates to the art of positioning controls and more particularly to a steering control for a vehicle such as a farm tractor, which comprises a reversible hydraulic actuator having a pair of control ports, a manually actuated source of fluid under pressure, a power actuated source of fluid under pressure, a distributor valve interposed between said control ports of said actuator and said sources of fluid under pressure, the valve being conformed so that in neutral position fluid under pressure is applied to both of the control ports of the actuator to pressurize the latter.

---

Figure 1:
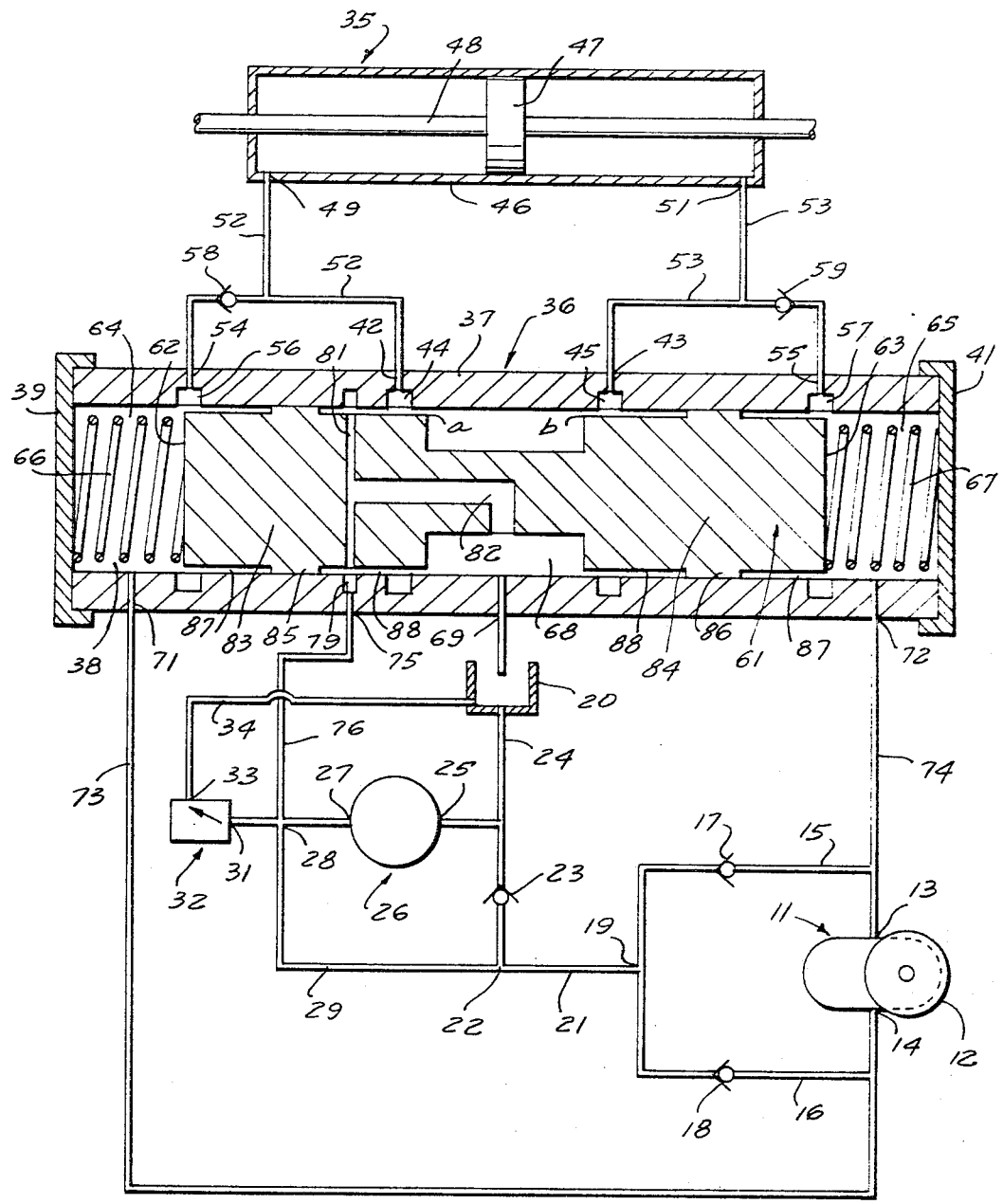

As conducive to an understanding of the invention, it is noted that where the wheels of a tractor are hydraulically controlled and a reversible hydraulic actuator is used as the means to effect movement of the steerable wheels of the tractor, due to the fact that air is normally present in any hydraulic system, difficulties arise when it is attempted to maintain the tractor in a straight path. More particularly, it has been found that approximately 10% of the volume of the reversible actuator contains air under atmospheric pressure, the remaining 90% being substantially uncompressible fluid such as a hydraulic fluid.

Thus, where the tractor is being driven along a straight path in the usual bumpy or rocky field, and one of the front wheels of the tractor, for example, should strike a rock, there would be a momentary high force exerted by the resultant movement of the wheel that would instantaneously cause compression of the gas at atmospheric pressure contained in the actuator. Where, for example, 10% of the volume of the actuator contains gas under atmospheric pressure, it has been found that under normal conditions where the wheels hit a rock, the gas in the actuator will be compressed and its pressure increased to equal the force resulting from the shock due to striking the rock and such gas will be compressed to say 50% of its original volume with the result that the piston of the actuator can move due to compression of the gas, and such movement where the wheels have a total range of movement of 100 degrees, would be 5% of such range or say, 5 degrees.

Consequently, even though the driver is rigidly holding the steering wheel which is not being moved, the wheels of the tractor will change their course by say 5 degrees and in order to maintain a straight path of movement, the driver would have to rotate the steering wheel to overcome such change of direction. This problem is particularly important where the field over which the tractor is being driven is extremely rocky and the wheels are constantly engaging rocks in the path of movement, for the driver would have to be constantly moving the steering wheel back and forth through a relatively large arc in order to maintain the straight line of drive desired.

This problem is enhanced by the fact that normally the steering wheel has to be turned through a far greater angle than the wheels that it controls, so that where the driver has to compensate for a 5 degree change in direction, he may have to turn the steering wheel through an angle often in the order of 30 degrees. Because of this action it is apparent that the driver will be under constant tension and will rapidly become weary.

It is accordingly among the objects of the invention to provide a steering system which is relatively simple in construction, dependable in operation and not likely to become deranged, even after long use, and in which in neutral position when the steering wheel is not being rotated, will have the movement of the actuator greatly minimized so that shock imparted to the steerable wheels of the vehicle will cause substantially no movement of the actuator with the result that the wheels will remain in the direction which they had been set, thereby maintaining the vehicle in its desired path without need for any substantial movement of the steering wheel by the driver of the vehicle.

According to the invention, these objects are accomplished by the arrangement and combination of elements hereinafter described and more particularly recited in the claims.

In the accompanying drawings in which are shown one or more of various possible embodiments of the several features of the invention, FIG. 1 is a diagrammatic view of one embodiment of the invention using an open center distributor valve, FIG. 2 is a view similar to FIG. 1 of another embodiment of the invention using a closed center distributor valve, and, FIG. 3 is a view similar to FIG. 1 of still another embodiment of the invention, also using a closed center distributor valve.

Referring now to the drawings, the position control system shown in FIG. 1 will be described with respect to its application to control the steering wheel of a farm tractor, for example.

As shown in FIG. 1, the system comprises a pump unit 11 of conventional type such as a bi-directional volumetric metering pump that is sold by the Ross Gear and Tool Company of Lafayette, Indiana. The pump unit 11 is controlled by a steering wheel 12 so that depending upon the direction of rotation of the steering wheel, fluid under pressure will be provided at the ports 13 or 14 respectively, of said pump 11.

The ports 13 and 14 are connected respectively by lines 15 and 16 through one-way valves 17 and 18 to junction 19, the one-way valves being positioned so that they will permit flow only from the junction 19 to the respective ports 13 or 14 as the case may be. The junction 19 is connected by line 21 to junction 22 which is connected through one-way valve 23 and line 24 to a reservoir 20, the valve 23 permitting flow only in direction from the reservoir to junction 22. Also connected to line 24 is the inlet 25 of a motor driven pump 26, the outlet 27 of said pump 26 being connected to junction 28 which in turn is connected by line 29 to junction 22. Junction 28 is also connected to the inlet 31 of a pressure relief valve 32, the outlet 33 of which is connected by line 34 to reservoir 20.

In order to control the flow of fluid between the hydraulic fluid sources 11 and 26 and an actuator 35, which controls the wheels of the tractor, a hydraulically controlled distributor valve 36 is provided which is shown on a much larger scale than the actuator and illustratively the area of the piston 47 is ten times the area of the ends 63, 62 of the valve member 61. As shown in FIG. 1, the distributor valve 36 comprises a cylindrical casing 37 having a bore 38 therethrough, the ends of which are closed by end caps 39 and 41. The distributor valve 36 has two outlet control ports 42, 43 centrally located along the length of the casing 37. Each of the ports 42, 43 leads into an associated annular groove 44, 45 in the casing 37.

The actuator 35 comprises a cylindrical casing 46 which has the piston 47 slidably mounted therein, said piston 47 having a piston rod 48 secured thereto and extending through both ends of the casing 46. The casing 46 has control ports 49, 51 adjacent each end thereof which are connected respectively by lines 52, 53 to the outlet control ports 42, 43.

The casing 37 of the distributor valve 36 has two inlet control ports 54, 55 outwardly spaced respectively from the outlet control ports 42, 43. Each of the ports 54, 55 leads into an associated annular groove 56, 57 in the casing 37 and is connected through one-way valves 58, 59 to lines 52, 53.

Slidably mounted in the bore 38 of casing 37 of the distributor valve 36 is the valve member or spool 61. As shown in FIG. 1, in neutral position of the valve member, the ends 62, 63 thereof are spaced from the closure caps 39, 41 respectively. Positioned in the chambers 64, 65 defined between each of the ends 62, 63 of the valve member 61 and the associated end caps 39, 41 is a coil spring 66, 67. The coil springs are identical in tension so as normally to retain the slidable valve member 61 in the neutral position shown.

As shown in FIG. 1, the valve member 61 has a central annular groove 68 which in all positions of the valve member 61 is in communication with the discharge port 69 leading into the reservoir 20. Each of the chambers 64, 65 has a port 71, 72 connected respectively by lines 73, 74 to the ports 14, 13 of the pump 11.

In the embodiment shown, the distributor valve 36 is of the open center type so that in neutral position the fluid under pressure from the pump 26 will flow back into the reservoir 20. To this end, as shown in FIG. 1, the casing 38 has a pressure inlet port 75 connected by line 76 to junction 28. The casing 37 has an internal annular groove 79 in communication with the port 75. As shown in FIG. 1, the valve member 61 has a transverse bore 81 which in neutral position of the valve member 61 will be aligned with the annular groove 79. The transverse bore 81 is connected by passageway 82 to annular groove 68.

As shown in FIG. 1, the portions of the valve member 61 on each side of the annular groove 68 define control portions 83, 84. Each of the control portions is of slightly reduced diameter on each side of its central portion which defines an annular guiding or centering rib 85, 86. Thus ribs 85, 86 are honed so as to accurately fit the bore of the casing 37 to insure exact centering, yet free sliding movement of the valve member therein. The reduced portions 87, 88 of each of the end portions 83, 84 define capillary passages for the purpose hereinafter to be set forth.

In the operation of the system shown in FIG. 1, with the unit in neutral position as shown and with the pump 26 energized, fluid under pressure from the pump 26, which is in the order of say 3000 p.s.i., will flow from the reservoir 20 through pump 26 to junction 28 and then through line 76 to port 75 of the distributor valve and through annular groove 79, into bore 81. The fluid will flow from bore 81, through passageway 82, into annular groove 68 and through port 69 to reservoir 20.

In the event that the tension of spring 66, 67 is not exactly equal, the bore 81 may not be exactly aligned with the groove 79. However, the flow of fluid into bore 81 would tend to react against one side thereof more than the other, thereby moving the valve member 61 slightly to substantially its exact neutral position.

As is shown in FIG. 1, when the valve member 61 is in neutral position, the ends 62, 63 thereof are positioned slightly inwardly from the outer edges of annular grooves 56, 57 to define a slight crack. In this position of the valve member 61, the inner ends *a*, *b* of end portions 83, 84 extend inwardly of the inner edges of annular grooves 44, 45 a greater amount than the ends 62, 63 of the valve member extend inwardly from the outer edges of grooves 56, 57.

As a result, as soon as the pump 26 is energized, fluid under pressure will flow through lines 29, 21, junction 19, valves 17, 18, lines 74, 73 into chambers 65, 64 and through ports 55, 54, valves 59, 58 into the control ports 51, 49 of the actuator 35 to compress the gas therein, proportionally to the back pressure provided for in neutral position of the valve member 61.

As a result as soon as any additional fluid is forced into either of the ports of the actuator, substantially immediate movement of the piston rod thereof will occur.

In addition, the fluid under pressure will also flow into ports 42, 43 of the distributor valve through lines 52, 53 and by reason of the capillary passages 87, 88 on opposed sides of the guiding ribs 85, 86, there will be an equalization of pressure with substantially no flow. As a result, the valve member 61 will not be laterally displaced so that friction thereof in the bore 38 will be minimized to insure rapid response to fluid under pressure forced into the control chambers 64, 65.

When the steering wheel is turned in direction, for example, to provide a source of fluid under pressure from the port 13, fluid will be drawn from the reservoir 20 through valves 23 and 18 into port 14 and forced from port 13 into port 72 and chamber 65 of the distributor valve, the one-way valve 17 preventing flow therethrough. Due to the fluid under pressure entering chamber 65, such fluid will react against the end 63 of valve member 61, moving the latter to the left from the position shown, against the force exerted by coil spring 66. The fluid in chamber 64 will return through port 71 and line 73 to the inlet 14 of the pump.

As soon as the valve member 61 starts to move to the left, the port 75 of valve 36 will be closed and hence the pressure in line 29 from pump 26 will rise and such pressure will be applied equally to valves 17, 18 and to both sides of the pump, i.e., to both of the ports 13 and 14. Consequently, the pressure in line 74 will be the pressure from pump 26 plus the pressure created while the steering wheel 12 is rotated which will be applied to port 51 of the actuator 35. However, as port 42 will still be closed since it requires additional travel of valve member 61 to the left to effect opening of such port after port 55 is substantially opened, the piston 47 will not move until return control port 42 begins to open. It is to be noted that even though the pressure will rise due to the flow from pump 26 to ports 13, 14, since the fluid under pressure will also flow into both of the chambers 64, 65, the pressure will still be equalized on both ends of the valve member 61 and it is only the added differential pressure due to the action of the steering wheel that will cause the member 61 to move.

Once the port 42 has begun to open then there will be flow of fluid from the associated port 49 of the actuator so that the piston 47 thereof can move to the left. Thus, the movement of the piston 47 of the actuator is controlled by the outlet port 42. Once the piston 47 starts to move it will move under the force not only that exerted by the pump 11, but also the force exerted by pump 26. As a result, the movement of the wheels of the tractor will be power assisted and only a slight force is required by the operator to turn the steering wheel 12.

In the event that the pump 26 should fail, then of course only the pump 11 will be in circuit to provide steering action, though with a lesser force. Due to the capillary passages 87, 88, the valve member 61 will not be transversely displaced which could cause cocking and therefore binding in the bore 38. As a result, rapid response of the valve member 61 to the movement of the steering wheel 12 is provided.

In addition, by reason of the pressurization of the actuator 35, the response of the piston rod 48 thereof to the entry of fluid under pressure into the actuator will also be substantially instantaneous, for enhanced sensitivity of the system to the action of the steering wheel.

When rotation of the steering wheel is stopped, the pressure in chambers 64, 65 will immediately be equalized and the spring 66 will return the valve member 61 to neutral position. As the result of such automatic restoration of the valve 36 to neutral position, every time the steering wheel 12 is stopped, there will no longer be any flow of fluid under high pressure to one side of the actuator 35, but there will only be balanced pressure on both sides of the actuator so that the wheels of the tractor will remain in the desired set position.

By reason of the one-way valves 58, 59 when the steering wheel is in neutral position, in the event there should be sudden impact against the steering wheel, for example, fluid under pressure will not be forced back into the pump 11 which would be reflected against the hands of the driver.

The embodiment shown in FIG. 2 is similar to the embodiment of FIG. 1 and corresponding parts have the same reference numerals primed.

Thus, the distributor valve 36' is identical to the valve 36 of FIG. 1 except that it is a closed center, rather than an open center valve and the line 76, port 75, annular groove 79, bore 81 and passageway 82 are not utilized.

In addition, a line 101 with a one-way valve 102 therein, extends from junction 28' to junction 22' and a pressure accumulator 103 of conventional type is connected in a line 104 leading from junction 22' to the port 105 of an unloader valve 106 which replaces the relief valve 32 of FIG. 1. The junction 28' is also connected to port 107 of valve 106 and the discharge port 108 of valve 106 is connected by line 34' to reservoir 20'.

In the system shown in FIG. 2, with the valve member 61' of distributor valve 36' in the neutral position shown, when pump 26' is energized, fluid under pressure will flow from reservoir 20', through the outlet 27' of pump 26' to junction 28'. The fluid will then flow through one-way valve 102 to charge the accumulator 103.

In addition, the fluid under pressure will flow through valves 17', 18', into lines 74', 73', into ports 72, 71 of the distributor valve and into the chambers 65', 64' thereof to pressurize the actuator 35' in the manner described with respect to the embodiment of FIG. 1. The operation of actuator 35' by rotation of steering wheel 12' of pump 11' is also identical to that of FIG. 1.

In the event the pump 26' should fail, the charged accumulator 103 will continue to supply fluid under high pressure to the system so that effective steering action with a minimum of effort by the driver is still possible.

After the accumulator has been fully charged, the unloader valve 106 will permit discharge of additional fluid back to the reservoir in conventional manner.

The embodiment shown in FIG. 3 is similar in many respects to the embodiments of FIGS. 1 and 2 and will only be described sufficiently for a clear understanding of the invention.

Thus, when the main pump 111 is energized, fluid under pressure in the order of say 3,000 p.s.i. will flow to the accumulator 112 to charge the latter and also will flow to junction 113 and through one-way valves 114, 115, to the two lines 116, 117 which are connected to the ports 118, 119 of a pump unit 121 controlled by a steering wheel 122.

The lines 116, 117 are connected to the ports 123, 124 of a distributor valve 125 and also through lines 126, 127, one-way valves 128, 129 to the inlet control ports 131, 132 of distributor valve 125. The distributor valve 125 has an outlet port 133 and two control ports 134, 135 which are connected by lines 136, 137 to the ports 138, 139 of an actuator 141 on each side of the piston 142 thereof respectively, the latter having a piston rod 143 connected thereto.

The pump 111 and the accumulator 112 are connected in conventional manner to an unloader valve 144, the discharge outlet of which is connected to a reservoir 145 to which the inlet 146 of pump 11 is also connected.

The distributor valve 125 has a bore 151, the ends of which are closed by end caps 152, 153. Slidably mounted in the casing 154 of the distributor valve is a valve member spool 155, the ends 156, 157 of which are spaced from the end caps 152, 153 respectively to define chambers 158, 159 into which the ports 124 and 123 respectively lead. A coil spring 161, 162 is positioned in each of the chambers 158, 159 and reacts against the valve member 155 normally to retain the latter in the neutral position shown.

More particularly, each of the ports 131, 132, 133 leads into an associated annular groove 163, 164, 165 in the bore of casing 154.

The valve member 155 has two longitudinally spaced annular grooves 171, 172 defining therebetween a central guiding rib 173 aligned with the annular groove 165 and closing the latter, and two end portions 174, 175.

Each of the end portions 174, 175 is of reduced diameter as at 176, 177 on the inner side thereof defining a relatively small capillary passageway. The inner edge *a*, *b* of each of the end portions 174, 175 extends slightly inwardly from the inner edge of each of the associated annular grooves 164, 163 to define a relatively small crack or passageway.

In the operation of the system shown in FIG. 3, when the pump 111 is energized, fluid under pressure will flow into each of the chambers 158, 159. However, since the pressure is balanced and equal in both chambers, this will not cause movement of the valve member 155. In addition, such fluid under pressure will also be applied through one-way valves 128, 129 into annular grooves 163, 164 and into the annular grooves 172, 171 in the valve member 155 and hence be applied to the ports 139, 138 of the actuator 141. As a result, in the manner previously described with respect to the embodiments of FIGS. 1 and 2, the actuator will be pressurized.

When the steering wheel 122 is rotated say in direction to apply a greater pressure at port 118 of pump unit 121, such additional fluid under pressure will flow into chamber 151 to react against the end 157 of valve member 155 and move the latter to the left. As a result, the port 131 will be completely closed, and port 132 will open further, but since port 133 still remains closed, there will be no discharge of fluid from the actuator 141.

With further slight rotation of the steering wheel, port 133 will open so that fluid may be discharged from port 139 of the actuator through annular groove 172 and port 133 to the reservoir 145. As a result, the force of the fluid under pressure from both the main pump unit 111 and the pump unit 121 flowing into port 132 and out of port 134 into port 138 of the actuator will effect movement of the piston 142 thereof.

It is apparent that the operation above described will function in reverse direction when the steering wheel 122 is turned in the opposite direction.

With the systems above described, it is apparent that the actuator will be pressurized in neutral position of the distributor valve when the steering wheel is not being rotated to insure dependable and rapid response of the system.

Furthermore, by reason of the force provided by the main pump, only relatively slight force is required to operate the actuator and this can readily be accomplished by the driver rotating the steering wheel.

Having thus described my invention, what I claim as new and desire to secure by Letters Patent of the United States is:

1. A position control system comprising a reversible hydraulic actuator having a pair of control ports, a manually actuated source of fluid under pressure, a power actuated source of fluid under pressure, a distributor valve interposed between said control ports of said actuator and said sources of fluid under pressure, said distributor valve having a movable valve member having a central annular groove defining two end portions, a pair of spaced ports leading into said distributor valve and normally closed by said end portions when said valve member is in neutral position, said spaced ports being connected respectively to the control ports of said actuator, an additional pair of spaced ports leading into said distributor valve and positioned outwardly of said first pair respectively and in communication with the respective control ports of said actuator, said distributor valve having a plurality of internal annular grooves in communication respectively with said spaced ports, the outer ends of said end portions being positioned slightly inwardly of the annular grooves associated with the additional pair of spaced ports to define a slight clearance and the inner ends of each of said end portions on each side of the annular groove of said valve member extending beyond the inner edges of the associated annular groove in said distributor valve to close the latter when said valve member is in neutral position, means normally retaining said valve member in neutral position, said valve member being recessed to provide relatively small passageways when in neutral position between said power actuated source of fluid under pressure and said central annular groove, said distributor valve having a pair of control chambers operatively connected respectively to said manually actuated source of fluid under pressure and in communication with opposed ends of said valve member to effect movement of the latter when the pressure in one of said chambers exceeds the pressure in the other of said chambers by a predetermined amount, said valve member being conformed to connect said power actuated source of fluid under pressure to one of the control ports of said actuator and to connect the other port of said actuator to return when said valve member has moved a predetermined amount.

2. The combination set forth in claim 1 in which resilient means are provided to retain said valve member in neutral position.

3. The combination set forth in claim 1 in which a one-way valve is positioned in each of the lines between the outer most annular groove in said distributor valve and the associated control port of said actuator.

4. The combination set forth in claim 1, in which said valve member comprises reduced diameter portions providing capillary passages whereby the frictions of the movable valve member are reduced to a minimum.

5. A position control system comprising a reversible hydraulic actuator having a pair of control ports, a manually actuated source of fluid under pressure having an outlet port, a power actuated source of fluid under pressure, a distributor valve interposed between said control ports of said actuator and said sources of fluid under pressure, said distributor valve having a movable valve member, said valve having a pair of spaced control ports connected respectively to the control ports of said actuator, an additional pair of control ports and a central discharge port positioned between said additional ports, said movable valve member having a pair of spaced annular grooves defining a pair of end portions and a central rib aligned with said central discharge port when the valve member is in neutral position to close said discharge port, an annular groove in said distributor valve associated with each of said additional ports and in communication therewith respectively, the inner edge of each of said end portions adjacent the associated annular groove in the valve member being positioned inwardly slightly from the associated annular groove in said distributor valve when the valve member is in neutral position to provide a small clearance, means normally retaining said valve means in neutral position, said valve member being recessed to provide relatively small passageways when in neutral position between said power actuated source of fluid under pressure and said spaced annular grooves, said distributor valve having a pair of control chambers, said manually actuated source of fluid under pressure having a pair of ports operatively connected respectively to said pair of control chambers, said control chambers being in communication with opposed ends of said valve member to effect movement of the latter when the pressure in one of said chambers exceeds the pressure in the other of said chambers by a predetermined amount, means connecting the ports of said manually operated source of fluid under pressure and the outlet port of said power driven source of fluid under pressure to said control chambers and two said additional ports of said distributor valve, each of said additional ports having a one-way valve associated therewith to permit flow in direction only into said additional port, said valve member being conformed to connect said power actuated source of fluid under pressure to one of the control ports of said actuator and to connect the other control port of said actuator to return when said valve member has moved a predetermined amount.

6. The combination set forth in claim 5 in which a pressure accumulator is provided operatively connected to the outlet of said power actuated source of fluid under pressure.

7. The combination set forth in claim 5, in which said velve member comprises reduced diameter portions providing capillary passages whereby the frictions of the movable valve member are reduced to a minimum.

References Cited

UNITED STATES PATENTS

| | | | |
|---|---|---|---|
| 2,816,420 | 12/1957 | Walsh | 137—625.66 |
| 2,879,748 | 3/1959 | Banker | 91—464 |
| 2,933,105 | 4/1960 | Jerman | 91—464 |
| 2,942,584 | 6/1960 | Rethmeier | 91—464 |
| 2,954,756 | 10/1960 | Donner | 91—460 |
| 2,969,775 | 1/1961 | Thelen | 91—464 |
| 2,985,145 | 5/1961 | Foerster | 91—464 |
| 3,060,688 | 10/1962 | Gonder | 91/464 |
| 3,016,708 | 1/1962 | Gordon | 91—460 |
| 3,159,230 | 12/1964 | Gordon. | |
| 3,358,711 | 12/1967 | Pruvot. | |
| 3,370,513 | 2/1968 | Shore | 91—51 X |

CARROLL B. DORITY, JR., *Primary Examiner*

U.S. Cl. X.R.

91—464, 466, 460